(12) United States Patent
Lang et al.

(10) Patent No.: US 11,698,731 B2
(45) Date of Patent: Jul. 11, 2023

(54) PERFORMANCE THROTTLING BASED ON POWER-OFF TIME

(71) Applicant: MICRON TECHNOLOGY, INC., Boise, ID (US)

(72) Inventors: Murong Lang, San Jose, CA (US); Zhenming Zhou, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/396,299

(22) Filed: Aug. 6, 2021

(65) Prior Publication Data

US 2023/0041421 A1 Feb. 9, 2023

(51) Int. Cl.
*G06F 12/00* (2006.01)
*G06F 3/06* (2006.01)

(52) U.S. Cl.
CPC .......... *G06F 3/0625* (2013.01); *G06F 3/0655* (2013.01); *G06F 3/0679* (2013.01)

(58) Field of Classification Search
CPC ..... G06F 3/0625; G06F 3/0655; G06F 3/0679
See application file for complete search history.

(56) References Cited

U.S. PATENT DOCUMENTS

| | | | | |
|---|---|---|---|---|
| 8,499,192 B2 * | 7/2013 | Rousseau | ............. | G06F 3/0616 714/49 |
| 2002/0062454 A1 * | 5/2002 | Fung | ..................... | G06F 3/0689 713/300 |
| 2013/0326459 A1 * | 12/2013 | Bickford | ............. | G06F 30/3312 716/133 |
| 2017/0060439 A1 * | 3/2017 | Harasawa | ............. | G06F 3/0656 |
| 2017/0160953 A1 * | 6/2017 | Hirata | .................... | G06F 3/0679 |
| 2017/0177217 A1 * | 6/2017 | Kanno | .................. | G06F 3/0625 |
| 2018/0052639 A1 * | 2/2018 | Woo | ........................ | G11C 7/22 |
| 2019/0220222 A1 * | 7/2019 | Ware | .................... | H01L 25/0657 |
| 2019/0278485 A1 * | 9/2019 | Benisty | ................. | G06F 3/0659 |
| 2019/0369871 A1 * | 12/2019 | Gaskill | ............... | G06F 12/0246 |
| 2020/0356438 A1 * | 11/2020 | Kim | ....................... | G06F 3/0679 |
| 2021/0109678 A1 * | 4/2021 | La Fratta | .............. | G06F 3/0611 |
| 2021/0141554 A1 * | 5/2021 | Koo | ........................ | G06F 3/0656 |

* cited by examiner

*Primary Examiner* — Shawn X Gu
*Assistant Examiner* — Mohammad S Hasan
(74) *Attorney, Agent, or Firm* — Lowenstein Sandler LLP (57) ABSTRACT

Responsive to a power-on of a memory device, an elapsed power-off time is identified based on a difference between a time at which the power-on occurred and a time at which a previous power-off of the memory device occurred. Responsive to a determination that the elapsed power-off time satisfies the elapsed time threshold criterion, a request to perform a first write operation on a memory unit of the memory device since power on is received, a performance parameter associated with the memory unit of the memory device is changed to a first parameter value that corresponds to a reduced performance level, and the write operation is performed on the memory unit of the memory device in accordance with the first parameter value that corresponds to the reduced performance level. Responsive to completion of the write operation, the performance parameter is changed to a value that corresponds to a normal performance level.

20 Claims, 8 Drawing Sheets

Responsive to a power-on of a memory device, determine an elapsed power-off time based on a difference between a time at which the power-on occurred and a time at which a previous power-off of the memory device occurred
502

Does elapsed power-off time satisfy an elapsed time threshold?
504

No → Enter Normal Mode
514

Yes ↓

Receive a request to perform a write operation on a memory unit of the memory device
506

Change a performance parameter associated with the memory unit of the memory device to a first parameter value that corresponds to a reduced performance level
508

Perform the write operation on the memory unit of the memory device in accordance with the first parameter value that corresponds to the reduced performance level
510

Responsive to completion of the write operation, change the performance parameter associated with the memory unit to a second parameter value that corresponds to a normal performance level
512

Performance Parameters 608

| Performance Level 602 | Host I/O Queue Depth | Maximum Parallel Jobs | Timing (W2R Delay) |
|---|---|---|---|
| Normal Performance Level 604 | 28 | 8 | T1 ms |
| Reduced Performance Level 606 | 8 | 4 | T2 ms |

Performance Parameters 708

| Performance Level 702 | Power-off Time Lower and Upper Thresholds 716 | Host I/O Queue Depth | Maximum Parallel Jobs | Timing (W2R, W2W, R2R, R2W Delays) | Performance Metric (IOPS) 718 | Power Consumption 720 |
|---|---|---|---|---|---|---|
| Normal Performance Level 704 | 0 hours, 24 hours | 64 | 16 | T3 ms, T4 ms, T5 ms, T6 ms | 5000 IOPS | P1 mW |
| First Reduced Performance Level 706A | 24 hours, 120 hours | 28 | 8 | T7 ms, T8 ms, T9 ms, T10 ms | 2500 IOPS | P2 mW |
| Second Reduced Performance Level 706B | 120 hours, unlimited | 8 | 2 | T11 ms, T12 ms, T13 ms, T14 ms | 1000 IOPS | P3 mW |

Reduced Performance Levels: {706A, 706B}

PERFORMANCE THROTTLING BASED ON POWER-OFF TIME

TECHNICAL FIELD

Embodiments of the disclosure relate generally to memory sub-systems, and more specifically, relate to performance throttling based on power-off time.

BACKGROUND

A memory sub-system can be a storage system, a memory module, or a hybrid of a storage device and memory module. The memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various implementations of the disclosure. The drawings, however, should not be taken to limit the disclosure to the specific embodiments, but are for explanation and understanding only.

DETAILED DESCRIPTION

Aspects of the present disclosure are directed to throttling performance of operations on a memory unit in a memory device to increase the amount of power available for use by a first write to the memory unit that occurs after the memory device is powered on. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a three-dimensional cross-point ("3D cross-point") memory device that includes an array of non-volatile memory cells. A 3D cross-point memory device can perform bit storage based on a change of bulk resistance, in conjunction with a stackable cross-gridded data access array. Another example is a negative-and (NAND) memory device. Other examples of non-volatile memory devices are described below in conjunction with FIG. 1. A non-volatile memory device is a package of one or more dies. Each die can consist of one or more planes. For some types of non-volatile memory devices (e.g., NAND devices), each plane consists of a set of physical blocks. Each block consists of a set of pages. Each page consists of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or three-dimensional grid. Memory cells are etched onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form a plane of the memory device in order to allow concurrent operations to take place on each plane. A memory device can be called a "drive", which has multiple dies layered in multiple "decks."

A read operation can be performed using a signal (e.g., applied to a wordline of the memory array) having a read voltage level. The read threshold voltage level or value (herein the "read voltage level") can be a particular voltage that is applied to memory cells of a memory device to read the data stored at the memory cells. For example, if a threshold voltage of a particular memory cell is identified as being below the read voltage level that is applied to the particular memory cell, then the data stored at the particular memory cell can be a particular value (e.g., '1') and if the threshold voltage of the particular memory cell is identified as being above the read voltage level, then the data stored at the particular memory cell can be another value (e.g., '0'). Thus, the read voltage level can be applied to memory cells to determine values stored at the memory cells.

In a conventional memory sub-system, when the threshold voltage programming distributions of a memory cell change, the application of the read voltage level can be inaccurate relative to the changed threshold voltage. For example, a memory cell can be programmed to have a threshold voltage below the read voltage level. The programmed threshold voltage can change over time and can shift to be above the read voltage level. For example, the threshold voltage of the memory cell can shift from initially being below the read voltage level to being above the read voltage level. As a result, when the read voltage level is applied to the memory cell, the data stored at the memory cell can be misread or misinterpreted to be at a wrong value as compared to the value as originally stored when the threshold voltage had not yet shifted.

As another example, the voltage shift that occurs while memory cells of a memory unit are powered off can cause a select bias (e.g., for selecting a reset cell) to increase for the first write operation that occurs on the memory unit after the memory cells are powered on subsequently to the powered off time period. The select bias returns to a normal level for subsequent write operations after the first write operation. However, if other operations are performed by the memory sub-system in parallel with the first write operation, and the other operations consume a substantial amount of power, (e.g., high-performance operations such as high-speed reads, or writes of other memory units), then there can be insufficient power available. That is, the amount of power available can be insufficient to meet the combined power demand of the higher select bias for the first write operation and the other operations being performed at high speed in parallel. If insufficient power is available, uncorrectable errors can occur. Existing memory sub-systems address this problem by performing an extra write operation when the memory sub-system is powered on. However, this extra write operation, also referred to as a power on scrub, has a performance penalty, and is often disabled by default.

Aspects of the present disclosure address the above and other deficiencies by using a performance throttling technique that reduces performance of a memory sub-system for a first write operation after a memory device is powered on. The performance throttling can be performed based on the amount of time for which the memory device was powered off prior to being powered on. The performance throttling can be performed if the time for which the memory device was powered off satisfies a threshold criterion. The amount by which the performance is reduced can be based on the amount of time for which the memory device was powered off. In one implementation, responsive to a power-on of a memory device, the memory sub-system determines an elapsed power-off time based on a difference between a time at which the power-on occurred and a time at which a previous power-off of the memory device occurred. The memory sub-system determines whether the elapsed power-off time satisfies an elapsed time threshold criterion. Responsive to determining that the elapsed power-off time satisfies the elapsed time threshold criterion, the memory sub-system receives a request to perform a first write operation on a memory unit of the memory device, changes a performance parameter associated with the memory unit to a first parameter value that corresponds to a reduced performance level, and performs the write operation on the memory unit at the reduced performance level. The first write operation can be the first write operation performed on the memory unit following the power-on of the memory sub-system.

The memory sub-system can also adjust the performance parameter in accordance with the amount of elapsed power-off time, e.g. by setting the performance parameter to a value corresponding to a first reduced performance level when the elapsed power-off time is in a first range, and setting the performance parameter to a value corresponding to a second reduced performance level lower than the first reduced performance level when the elapsed power-off time is in a second range that is higher than the first range. The performance parameter can be, for example, a maximum number of memory operations that can be performed in parallel, a memory operation queue depth, or a timing delay between consecutive memory operations. The memory sub-system can reduce performance by changing one or more of these parameters to the first value, which corresponds to the reduced performance level, from the second value, which corresponds to a normal or baseline performance level. Upon completion of the write operation, the memory sub-system can restore performance to the normal or baseline level by changing the performance parameter to the second parameter value. Since the performance parameters are associated with a particular memory unit, the reduction in performance during the first write operation does not reduce performance of other memory units. The operations described above can be performed for each memory unit until all memory units of the memory device have been written to at least once after the power-on.

Advantages of the present disclosure include, but are not limited to, avoidance of read errors that can occur when a memory sub-system is powered on. As described above, a first write operation that occurs after power-on of a memory device that has been powered off can use more power than subsequent write operations because of effects of temporal voltage shift, such as draft of the cell selection bias to higher voltages. The amount of power used by the first write operation can be proportional to the amount of elapsed power-off time. If the memory sub-system is operating in a high-performance mode, and the memory device was powered off for a sufficient amount of time, there can be insufficient power available to perform the first write operation and other operations, such as read operations occurring in parallel, after power on. Read errors, including uncorrectable read errors, can occur as a result of this power deficit. Embodiments of the present disclosure can avoid the power deficit and related read errors by throttling performance of memory operations on a memory unit of the memory device while the first write operation on the memory unit after at least a threshold amount of elapsed power off time. If the elapsed power off time is sufficiently high, e.g., at least the threshold amount, then the amount of voltage drift and the corresponding amount of power needed for the first write operation can be sufficient to cause a power deficit. The power deficit can be avoided by performance throttling during the first write operation, since reducing performance reduces power consumption.

Figure 1:
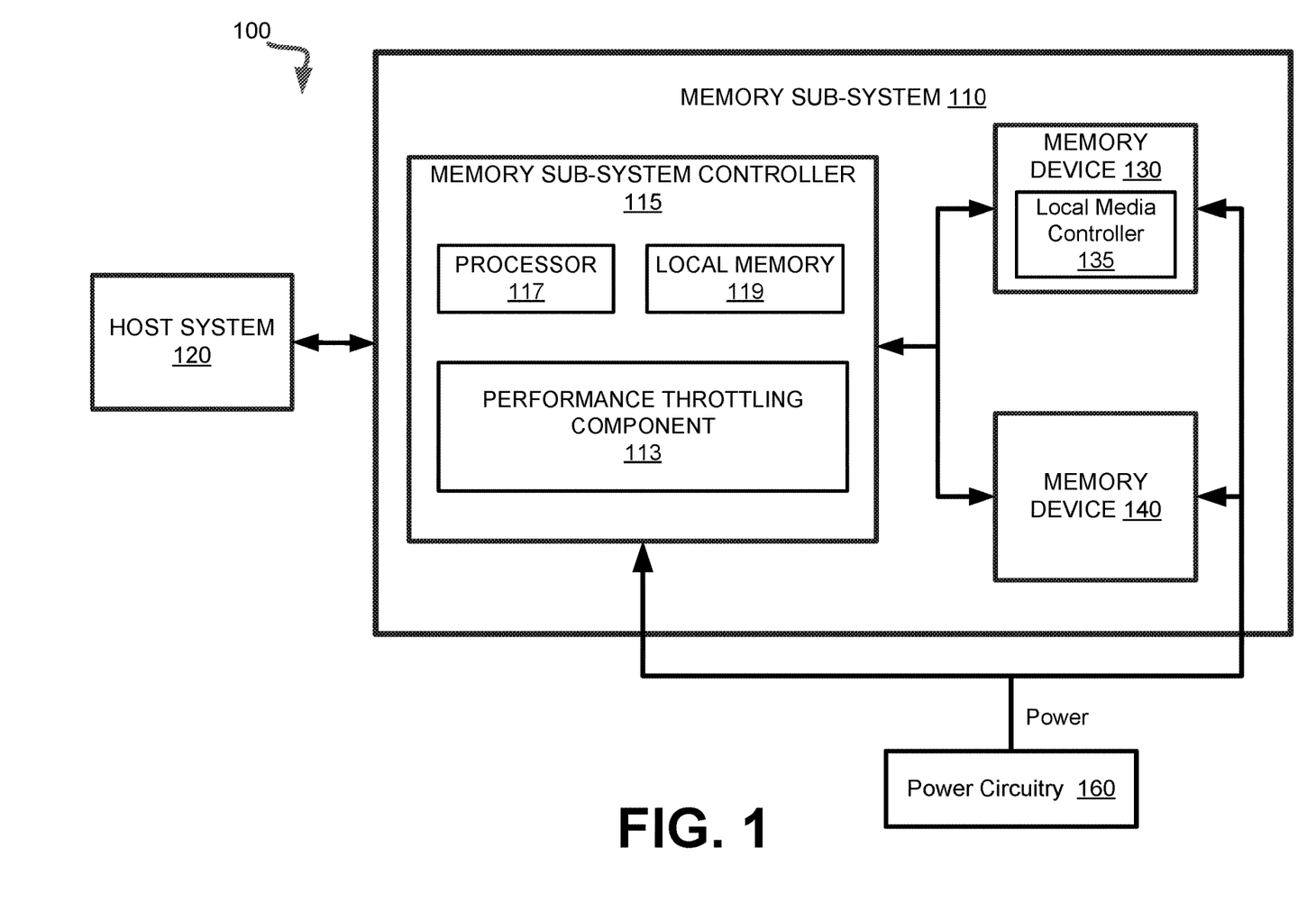
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, and a hard disk drive (HDD). Examples of memory modules include a dual in-line memory module (DIMM), a small outline DIMM (SO-DIMM), and a non-volatile dual in-line memory module (NVDIMM).

The computing environment 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. The host system 120 uses the memory sub-system 110, for example, to write data to the memory sub-system 110 and read data from the memory sub-system 110. As used herein, "coupled to" generally refers to a connection between components, which can be an indirect communicative connection or direct communicative connection (e.g., without intervening components), whether wired or wireless, including connections such as electrical, optical, magnetic, etc.

The host system 120 can be a computing device such as a desktop computer, laptop computer, network server, mobile device, a vehicle (e.g., airplane, drone, train, automobile, or other conveyance), Internet of Things (IoT) devices, embedded computer (e.g., one included in a vehicle, industrial equipment, or a networked commercial device), or such computing device that includes a memory and a processing device. The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory sub-system 110. The host system 120 can further utilize an NVM Express (NVMe) interface to access the memory components (e.g., memory devices 130) when the memory sub-system 110 is coupled with the host system 120 by the PCIe interface. The physical host interface can provide an interface for passing control, address, data, and other signals between the memory sub-system 110 and the host system 120.

The memory devices can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased.

Although non-volatile memory components such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric random access memory (FeRAM), magneto random access memory (MRAM), negative-or (NOR) flash memory, and electrically erasable programmable read-only memory (EEPROM).

One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory component can include an SLC portion, and an MLC portion, a TLC portion, or a QLC portion of memory cells. The memory cells of the memory devices 130 can be grouped as pages or codewords that can refer to a logical unit of the memory device used to store data. With some types of memory (e.g., NAND), pages can be grouped to form blocks. Some types of memory, such as 3D cross-point, can group pages across dice and channels to form management units (MUs).

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor (processing device) 117 configured to execute instructions stored in local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical block address and a physical block address that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 includes a performance throttling component 113 that can be used to reduce memory sub-system performance based on an amount of time for which the memory sub-system 110, or a particular memory device 130, 140 of the memory sub-system 110, was powered off prior to being powered on. The computing environment 100 can include power circuitry 160, which can provide electrical power to the components of the memory sub-system 110. The power circuitry 160 can provide power to the memory sub-system 110, including the memory sub-system controller 115, the memory device 130, and the memory device 140. The power circuitry 160 can provide the power in response to a power-on command or signal, and can continue providing the power until it receives a power-off signal or command.

In one embodiment, responsive to a power-on of a memory device 130, the performance throttling component 113 determines an elapsed power-off time based on a difference between a time at which the power-on occurred and a time at which a previous power-off of the memory device 130 occurred. The performance throttling component 113 determines whether the elapsed power-off time satisfies an elapsed time threshold criterion. Responsive to determining that the elapsed power-off time satisfies the elapsed time threshold criterion, the performance throttling component 113 receives a request to perform a first write operation on a memory unit of the memory device 130, changes a performance parameter associated with the memory unit to a first parameter value that corresponds to a reduced performance level, and performs the write operation on the memory unit at the reduced performance level. The first write operation can be the first write operation performed on the memory unit following the power-on of the memory sub-system 110. Alternatively or additionally, a write flag or counter can be associated with each memory unit. The performance throttling component 113 can set the write flag of each memory unit to false when the memory unit's memory device 130 is powered on. When a write request is received, the performance throttling component 113 can determine whether the write request is for the first write after power on by determining whether the write flag is false. If the write flag is false, the performance throttling component 113 can perform performance throttling based on the amount of elapsed power off time as described above. The performance throttling component 113 can then set the write flag to true and restore performance to the normal level when the first write operation on the memory unit is complete. For subsequent requests to write to the memory unit, the performance throttling component 113 does not perform performance throttling because the write flag is true. The performance throttling component 113 can stop operating if it determines that each memory unit has been written to at least once since power on of the memory unit.

In this way, the performance throttling component 113 can throttle performance for operations performed on each memory unit during the first write to the memory unit, and restore performance for the memory unit to a normal or baseline level subsequent to the first write operation.

The performance throttling component 113 can also adjust the performance parameters in accordance with the amount of elapsed power-off time, e.g. by setting the performance parameters to values corresponding to a first reduced performance level when the elapsed power-off time is in a first range, and setting the performance parameters to values corresponding to a second reduced performance level lower than the first reduced performance level when the elapsed power-off time is in a second range that is higher than the first range. The performance throttling component 113 can perform the operations described above prior to enabling other write operations to be performed, so that the first write operation described above is the first write operation performed on the memory unit following the power-on.

The performance parameter can be, for example, a maximum number of memory operations that can be performed in parallel, a memory operation queue depth, or a timing delay between consecutive memory operations. The memory sub-system 110 can reduce performance by changing one or more of these parameters to the first value, which corresponds to the reduced performance level, from the second value, which corresponds to a normal or baseline performance level. Upon completion of the write operation, the memory sub-system 110 can restore performance to the normal or baseline level by changing the performance parameter to the second parameter value. Since the performance parameters are associated with a particular memory unit, the reduction in performance during the first write operation does not reduce performance of other memory units. The operations described above can be performed for each memory unit until all memory units of the memory device 130 have been written to at least once after the power-on. Further details relating to the operations of the performance throttling component 113 are described below.

Figure 2A:
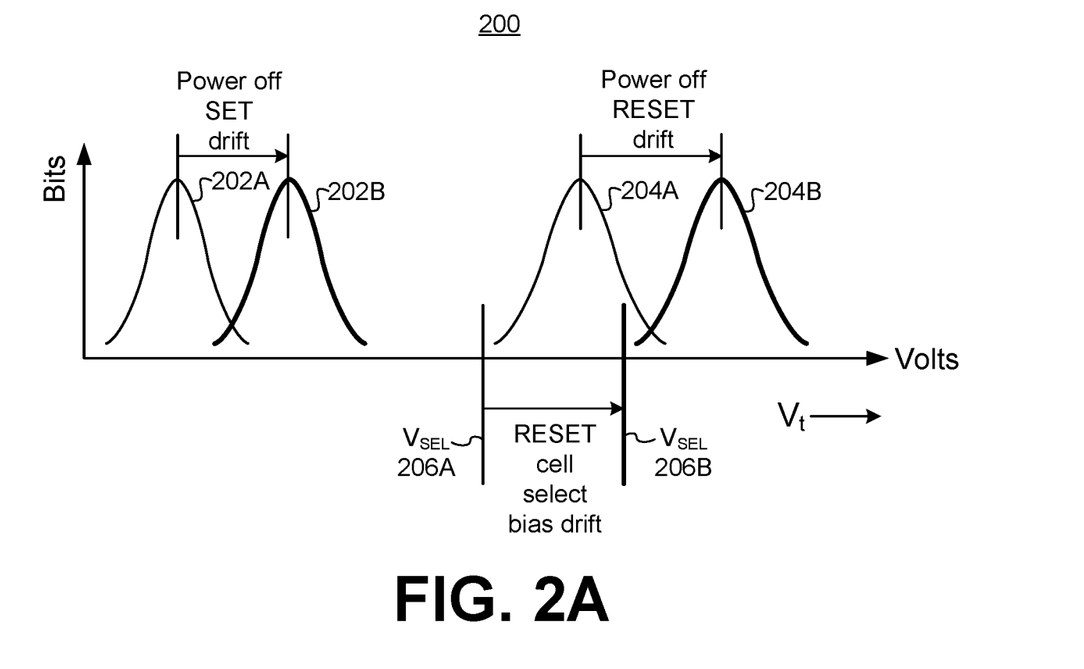
FIG. 2A illustrates examples of temporal voltage shift in a memory device in accordance with some embodiments.

FIG. 2A illustrates examples of temporal voltage shift in a memory device 130 in accordance with some embodiments. Shown on a graph 200 are a SET voltage distribution 202A, which corresponds to a programmed value of, e.g., 0, and a RESET voltage distribution 204A, which corresponds to a programmed value of, e.g., 1. The horizontal (Volts) axis represents voltage values, which increase toward the right. The initial SET distribution 202A has drifted to a shifted SET distribution 202B during a time period. The memory device 130 can be in a powered off state for at least a portion of the time period. The amount of voltage shift between SET distributions 202A, 202B is labeled "Power off SET drift." Similarly, the initial RESET distribution 204A has drifted to a shifted RESET distribution 204B during the same time period. The amount of voltage shift between RESET distributions 204A, 204B is labeled "Power off RESET drift." A threshold read level voltage (not shown) that demarcates the shifted SET distribution 202B and the shifted RESET distribution 204B has also shifted. An initial RESET cell select bias VSEL 206A has also drifted to a shifted RESET cell select bias VSEL 206B, as indicated by the label "RESET cell select bias drift." Since the RESET cell select bias has drifted to a higher voltage VSEL 206B, the power demand for selecting the RESET cell to write data has also increased.

Figure 2B:
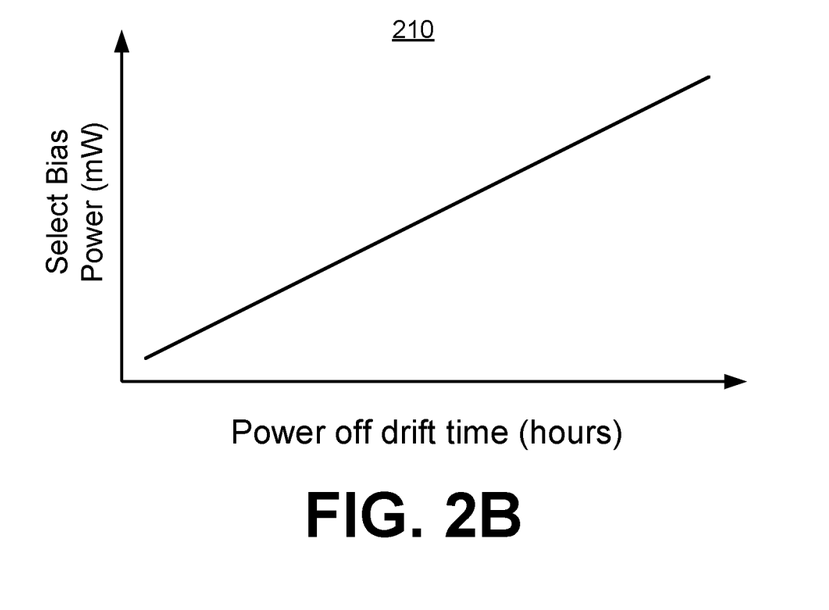
FIG. 2B illustrates an example relation between elapsed power-off time and select bias power demand that occurs when a memory device is subsequently powered on in accordance with some embodiments.

FIG. 2B illustrates an example relation between elapsed power-off time and select bias power demand that occurs when a memory device 130 is subsequently powered on in accordance with some embodiments. As shown by graph 210, the power needed to generate the voltage to select a RESET cell in a write operation increases as the amount of power off time increases. Thus, after a relatively short power off time (e.g., less than a threshold time), the power demand for a first write operation after power on of the memory device 130 containing the RESET cell is relatively low, but after a longer period of time (e.g., the threshold time), the power demand for the first write operation after power on is higher. Since the first write operation programs the memory unit that includes the cell, the power demand for subsequent write operations on the memory unit becomes relatively low for a period of time, but increases over time because of the temporal voltage shift effect.

Figure 3:
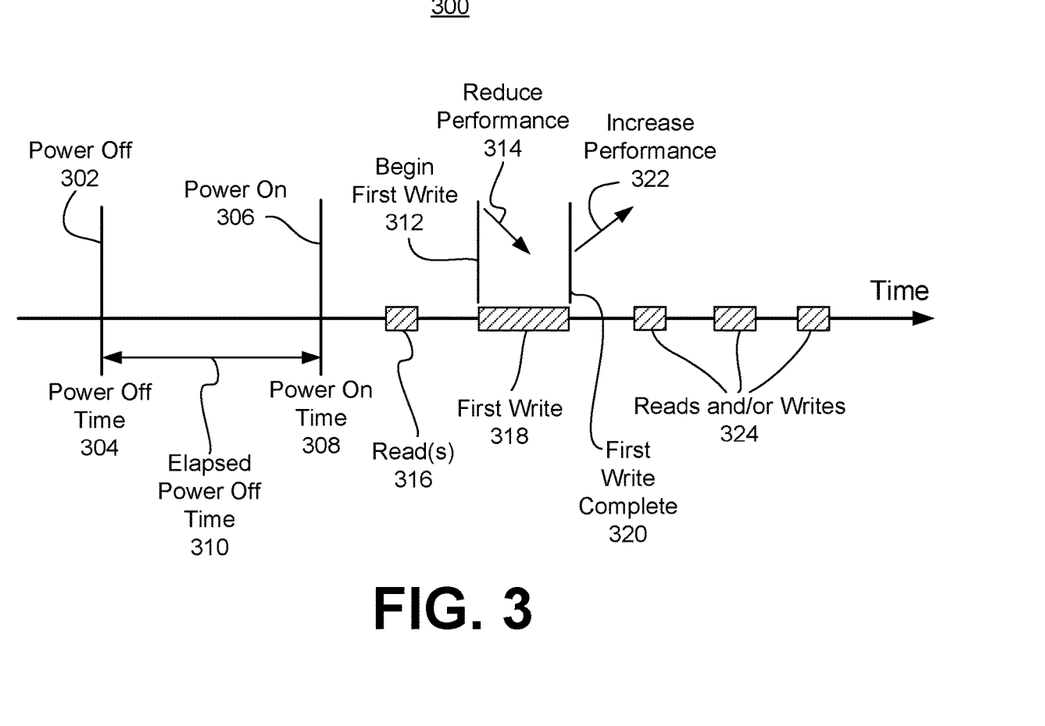
FIG. 3 illustrates an example timing diagram of performance throttling in relation to elapsed power-off time and a first write operation after power-on in accordance with some embodiments.

FIG. 3 illustrates an example timing diagram 300 of performance throttling in relation to elapsed power-off time and a first write operation after power-on in accordance with some embodiments. The timing diagram 300 shows example events in the operation of a memory device 130. The times at which the events occur are represented by the positions of the events on the horizontal (time) axis. A power off event 302 of the memory device occurs at a power off time 304, and a power on event 306 of the memory device occurs at a power on time 308. The difference between the power on time 308 and the power off time 304 is an elapsed power off time 310.

The power off event 302 can occur in response to a user switching off or otherwise disconnecting the power source that provides electrical power to the memory device, by the memory sub-system 110 or host system 120 performing an operation that shuts down the memory device, by loss of power at the power source because of a fault or failure, or other cause. For example, the power off event 302 can occur as a result of a memory sub-system 110 being powered off, or as a result of the memory device 130 being powered off while other components of the memory sub-system, such as other memory devices 130, remain powered on, for example. The memory sub-system 110 can be powered off in response to power off of a drive that includes the memory device. In another example, the memory sub-system 110 (and associated memory devices 130, 140) can be powered off while other components of the drive remain powered on.

In response to the power on event 306, the performance throttling component 113 determines whether the elapsed power off time 308 satisfies a threshold criterion, e.g., is at least a threshold value. If not, the performance throttling component 113 takes no further action until another power on event 306 occurs at a subsequent time. If the elapsed power off time 308 satisfies the threshold criterion, the performance throttling component 113 can wait until a request to perform a first write 318 is received. When the request to perform the first write 318 is received, the performance throttling component 113 can identify a memory unit specified by the request to perform the first write 318. The performance throttling component 113 performs a performance throttling operation 314 to reduce the performance level of the memory sub-system 110 for read and/or write operations that are performed on the identified memory unit subsequent to the throttling operation 314.

The performance throttling component 113 can perform the performance throttling operation 314 in response to determining that the elapsed power off time 310 satisfies the threshold condition. Alternatively, the performance throttling component 113 can perform the performance throttling operation 314 in response to the request to perform the first write. Thus, performance of the memory sub-system during the first write 318 is reduced. When the first write 318 completes, as shown by a first write complete event 320, the performance throttling component 113 performs a performance increase operation 322 to increase performance of the memory-subsystem. The performance increase operation 322 can restore the performance level of the memory sub-system 110 for operations performed on the memory unit to a normal performance level (e.g., to a baseline level). Subsequent to the performance increase operation 322, the memory sub-system 110 can perform one or more reads and/or writes 324 at the normal performance level.

In one example, one or more optional read operations 316 can be performed on the memory unit by the memory sub-system 110 between the power on time 308 and the first write 312. That is, the optional read operations 316 can be performed prior to the performance throttling operation 314. As an alternative to waiting for the request to perform the first write 318, the performance throttling component 113 can perform the performance throttling operation 314 sooner, e.g., in response to determining that the elapsed power off time 308 satisfies the threshold criterion.

Figure 4:
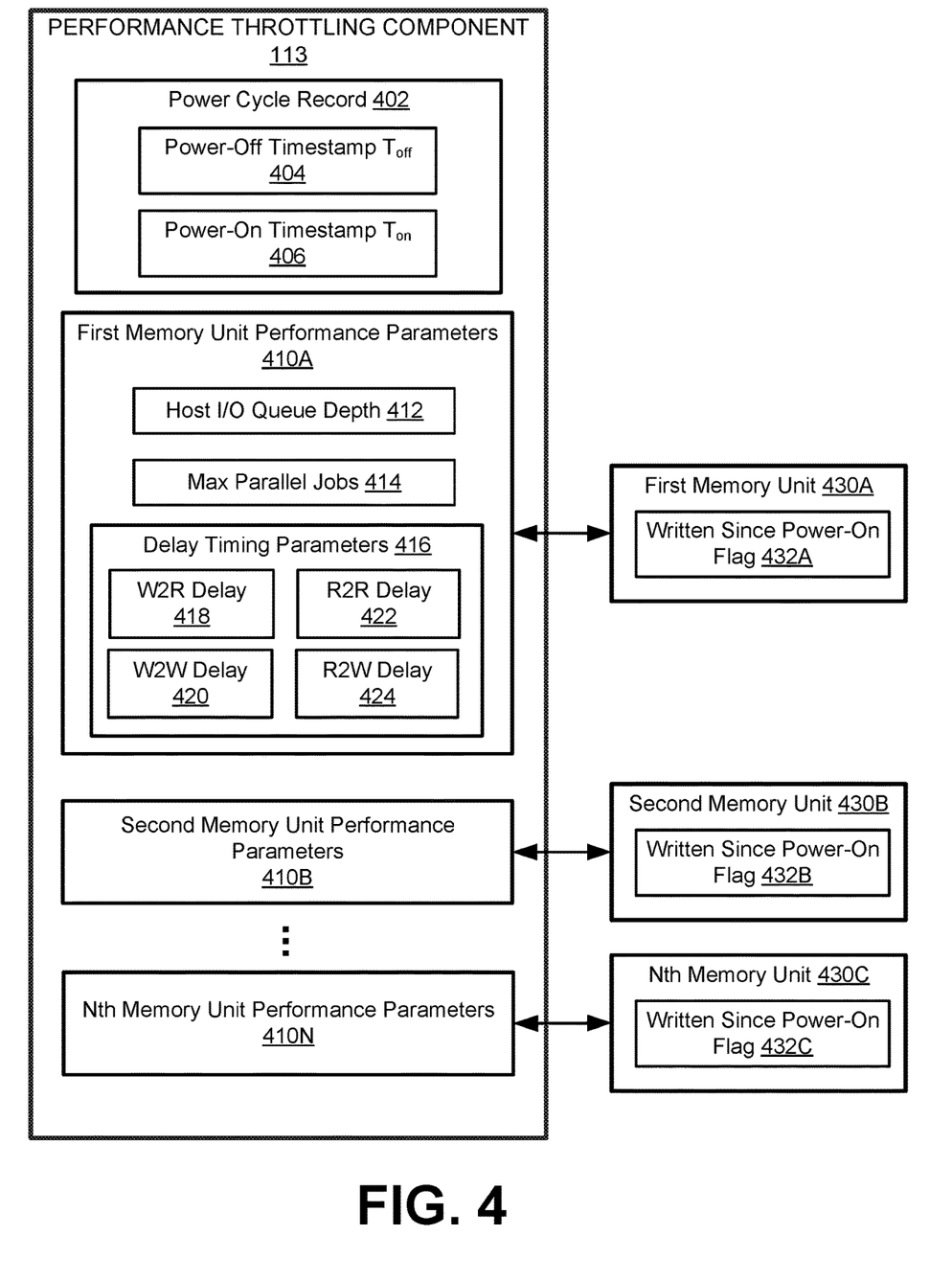
FIG. 4 illustrates an example performance throttling component that adjusts performance parameters based on elapsed power-off time in accordance with some embodiments.

FIG. 4 illustrates an example performance throttling component 113 that adjusts performance parameters based on elapsed power-off time in accordance with some embodiments. The performance throttling component 113 includes a power cycle record 402 and one or more sets of performance parameters 410. Each set of performance parameters 310 corresponds to a memory unit 430. Thus, first memory unit performance parameters 410A are associated with a first memory unit 430, second memory unit performance parameters 410B are associated with a second memory unit 430B, and Nth memory unit performance parameters 410N are associated with an Nth memory unit 430C. Since each set of performance parameters 410 is associated with a memory unit 430, changing the values of a particular set of performance parameters changes the performance (e.g., memory operation throughput and/or latency) of memory operations performed on the associated memory unit 430. The performance throttling component 113 can adjust the performance parameters 410 of a first memory unit 430A independently of the performance parameters 410B of a second memory unit 430B.

Each set of performance parameters includes one or more of a host I/O queue depth 412, a maximum number of parallel jobs 414, and delay timing parameters 416. The host I/O queue depth 412 specifies an upper limit on how many I/O operations (e.g., reads and writes) can be waiting in a queue to be performed by the memory sub-system 110. The memory sub-system 110 can efficiently identify the next operation to be performed by retrieving the operation at the head of the queue. Reducing the host I/O queue depth 412 can reduce performance of the memory sub-system 110, e.g., by reducing the rate at which read and write operations are performed, because the rate at which read and write requests from the host system 120 can be processed is reduced. The I/O operations can be, for example, read operations and write operations requested by the host system 120. For example, if the queue depth 412 is 32, then up to 32 I/O operations can be waiting in an operation queue. If the queue depth 412 is reduced to 16, then up to 16 I/O operations can be waiting in the operation queue. Thus, a queue depth 412 of 16 correspond to lower memory sub-system performance than a queue depth of 32.

The maximum number of parallel jobs ("max jobs") 414 specifies an upper limit on the number of I/O operations that can be performed in parallel by the memory sub-system 110. Reducing the max jobs parameter 414 can reduce performance of the memory sub-system 110. For example, if the max jobs 414 is 8, then the memory sub-system 110 can perform up to 8 I/O operations in parallel. If the max jobs 414 is reduced to 4, then the memory sub-system 110 can perform up to 4 I/O operations in parallel. Thus, a max jobs value of 4 corresponds to lower memory sub-system performance than a max jobs value of 8.

The delay timing parameters 416 include one or more of a write to read (W2R) delay 418, a write to write (W2 W) delay 420, a read to read (R2R) delay 422, and a read to write (R2 W) delay 424. Each delay timing parameter 416 specifies an amount of time that the performance throttling component 113 is to wait between the respective operations on a memory unit 430. For example, the W2R delay 418 specifies an amount of time that the performance throttling component 113 is to wait between a write operation and the next read operation on the same memory unit 430. Thus, increasing the value of a delay time parameter 416 can reduce performance of the memory sub-system 110. For example, a W2R delay of 20 milliseconds causes the memory sub-system 110 to wait 20 milliseconds between completion of a write operation and initiation of the next read operation on the same memory unit. A W2R delay of 30 milliseconds causes the memory sub-system 110 to wait 30 milliseconds instead of 20 milliseconds, thereby reducing the rate at which read operations that follow write operations on the same memory unit can be performed.

Each memory unit 430 can include or be associated with a "written since power-on" flag 432. The flag 432 indicates whether the associated memory unit 430 has been written to since power on of the memory unit 430. The flag 430 can be used in some embodiments to determine whether a requested write operation is the first write operation after power on for a particular memory unit 430. The flag 432 of each memory unit 430 can be set to a value of false when the memory device that includes the memory unit (or the memory sub-system 110) is powered on. Each write operation on a memory unit 430 can then set the flag 432 of the memory unit 430 to true upon completion of a write to the memory unit. The performance throttling component 113 can determine whether to reduce performance for a particular memory unit 430 by checking whether the flag 432 of the memory unit 430 is false. If the flag 430 is false for a memory unit 430 specified in a requested write operation, then the performance throttling component 113 can reduce performance for the requested write operation.

Figure 5A:
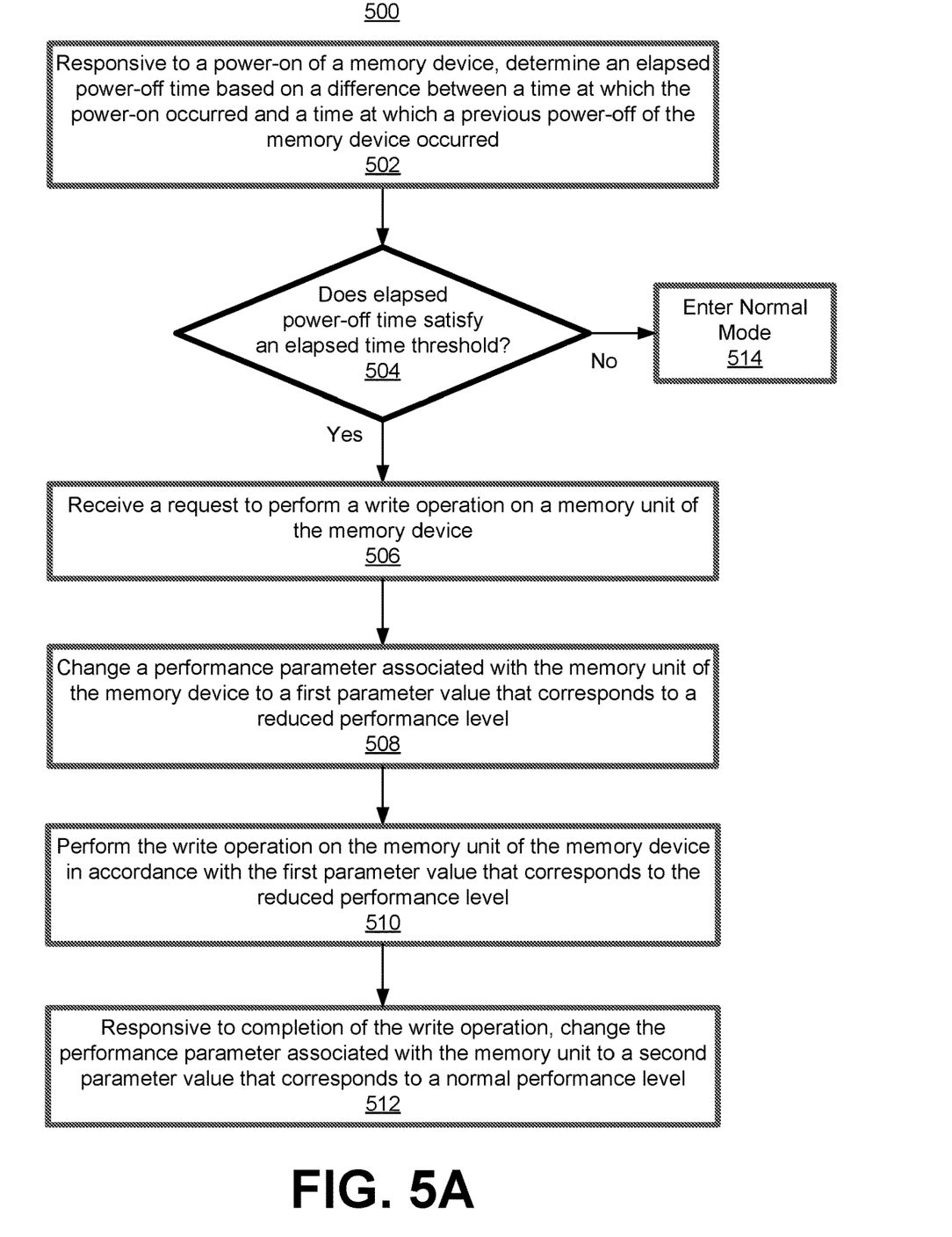
FIG. 5A is a flow diagram of an example method to throttle performance based on elapsed power-off time in accordance with some embodiments.

FIG. 5A is a flow diagram of an example method 500 to throttle performance based on elapsed power-off time in accordance with some embodiments. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the performance throttling component 113 of FIG. 1. The method 500 can be performed for each memory unit prior to processing write operations for the memory unit. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 502, responsive to a power-on of a memory device, the processing device determines an elapsed power-off time based on a difference between a time at which the power-on occurred and a time at which a previous power-off of the memory device occurred.

At operation 504, the processing device determines whether the elapsed power-off time satisfies an elapsed time threshold criterion. The elapsed time threshold criterion can include a minimum elapsed time value and can be satisfied when the elapsed power-off time meets or exceeds the minimum time value. The minimum time value can be, for example, 24 hours. The threshold criterion can also include a maximum time value, in which case the elapsed time threshold can be satisfied when the elapsed power-off time is between the minimum and maximum time values (e.g., is greater than or equal to the minimum time value and is less than the maximum time value). The minimum time value can be, e.g., 24 hours, and the maximum time value can be, e.g., 120 hours. These values are merely examples, and other minimum and maximum time values can be used. If at operation 504, the processing device determines that the elapsed power-off time does not satisfy the elapsed time threshold, then the processing device can perform operation 514. At operation 514, the processing device enters a normal mode and handles write requests without reducing the performance parameter values. In the normal mode, the performance parameters have normal, e.g., non-reduced, values, and power consumption of the memory sub-system can be at a normal power consumption level. If at operation 504, the processing device determines that the elapsed power-of time satisfies the elapsed time threshold criterion, then the processing device can perform operation 506. At operation 506, the processing device receives a request to perform a write operation on a memory unit of the memory device. Since the method 506 is performed prior to processing write operations, the requested write operation is the first write operation to be performed after power-on of the memory device.

At operation 508, the processing device changes a performance parameter associated with the memory unit of the memory device to a first parameter value that corresponds to a reduced performance level. For example, the processing device can set one or more of the performance parameters 410 that correspond to the memory unit 430 to a value that corresponds to a reduced performance level as described above, for example, with respect to FIG. 4.

At operation 510, the processing device performs the write operation on the memory unit of the memory device in accordance with the first parameter value that corresponds to the reduced performance level. Since one or more performance parameters 410 that correspond to the memory unit 430 have been set to values that correspond to a reduced performance level, performing the write at operation 510 causes the write operation to be performed at a reduced performance level.

At operation 512, responsive to completion of the write operation, the processing device changes the performance parameter of the memory unit to a second parameter value that corresponds to a normal performance level. That is, the processing device can restore the performance parameters 410 to the values they had prior to the performance adjustment that was performed at block 508. The prior value(s) can be, for example a normal or baseline values.

Figure 5B:
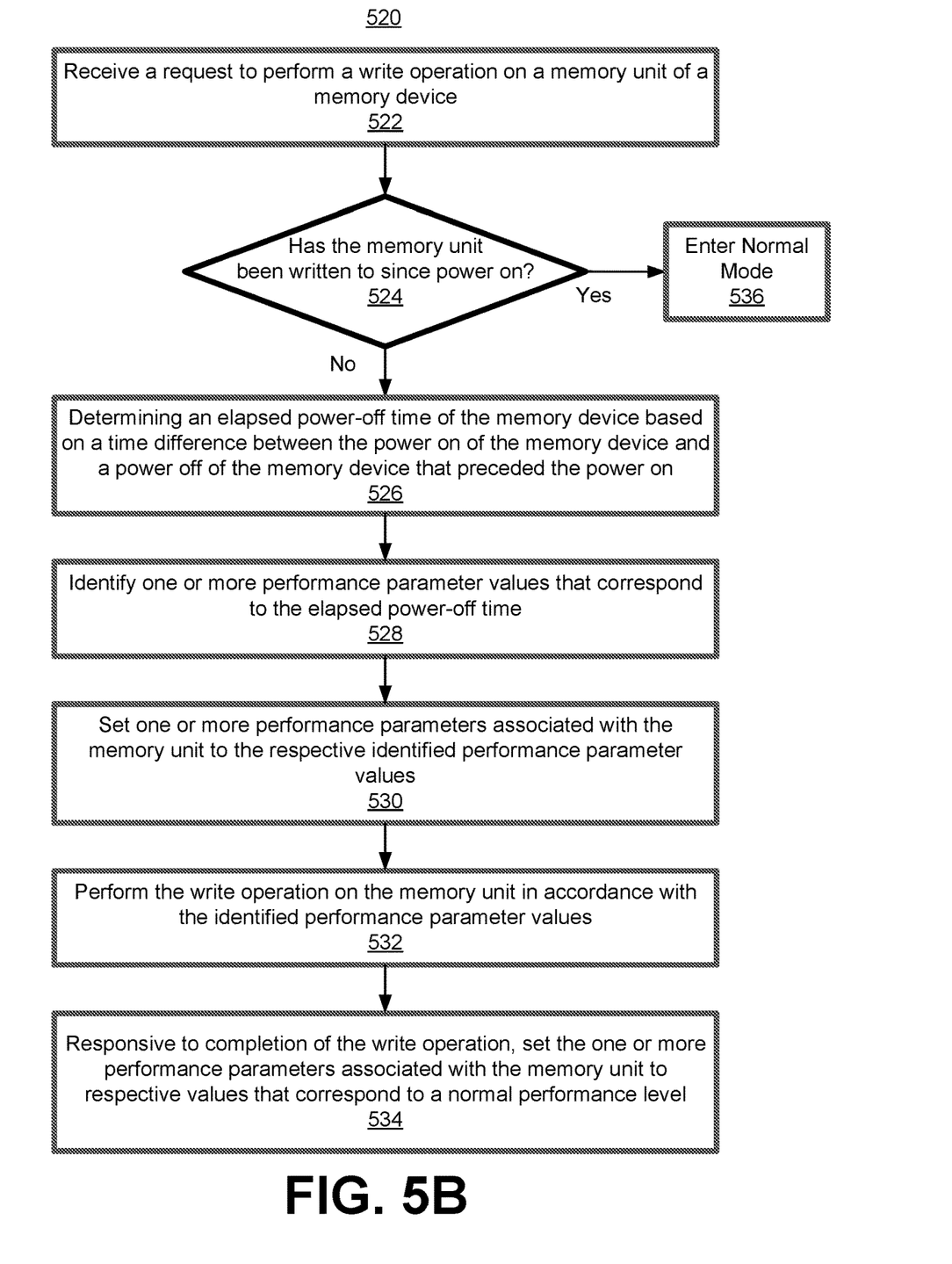
FIG. 5B is a flow diagram of an example method 520 to throttle performance using performance parameter values determined based on elapsed power-off time in accordance with some embodiments.

FIG. 5B is a flow diagram of an example method 520 to throttle performance using performance parameter values determined based on elapsed power-off time in accordance with some embodiments. The method 520 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 520 is performed by the performance throttling component 113 of FIG. 1. The method 520 can be performed for each memory unit prior to processing write operations for the memory unit. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 522, the processing device receives a request to perform a write operation on a memory unit of a memory device. At operation 524, the processing device determines whether the memory unit has been written to (e.g., programmed) in the time since the memory device was powered on. If so, the write operation reset the effects of voltage drift that occurred while the memory device was powered off. Thus, if at operation 524 the processing device determines that the memory device has been written to since the memory device was powered on, the processing device can perform operation 536. At operation 536, the processing device enters a normal mode and handles write requests without changing the performance parameters. Otherwise, the memory unit has been written to since power on, and the processing device continues on to operation 526.

At operation 526, the processing device determines an elapsed power-off time of the memory device based on a time difference between the power on of the memory device and a power off of the memory device that preceded the power on. At operation 528, the processing device identifies one or more performance parameter values that correspond to the elapsed power-off time as described herein, for example, with respect to FIG. 7. For example, the processing device identifies which of the performance levels 702 has power-off time lower and upper thresholds 716 that specify a range containing the elapsed power-off time from operation 526. The performance parameter values that correspond to the elapsed power-off time are specified by the identified performance level 702. For example, if the elapsed power-off time is 30 hours, then the table 700 of FIG. 7 indicates that the elapsed power-off time is between the upper and lower thresholds 716 associated with the first reduced performance level 706A. The values of the performance parameters 708 specified in the table 700 for the first reduced performance level 706A are a host I/O queue depth of 28, a maximum parallel jobs of 8, and timing (W2R, W2 W, R2R, R2 W delays) of T7 ms, T8 ms, T9 ms, and T10 ms.

At operation 530, the processing device sets one or more performance parameters 410 associated with the memory unit 430 to the respective identified performance parameter values. For example, the processing device can set the host I/O queue depth associated with the memory unit 430 to 28, the maximum parallel jobs associated with the memory unit 430 to 8, and the timing delays associated with the memory unit 430 to those of the first reduced performance level 706A, which are T7 milliseconds (ms), T8 ms, T9 ms, and T10 ms (for the W2R, W2 W, R2R, and R2 W delays, respectively).

Figure 7:
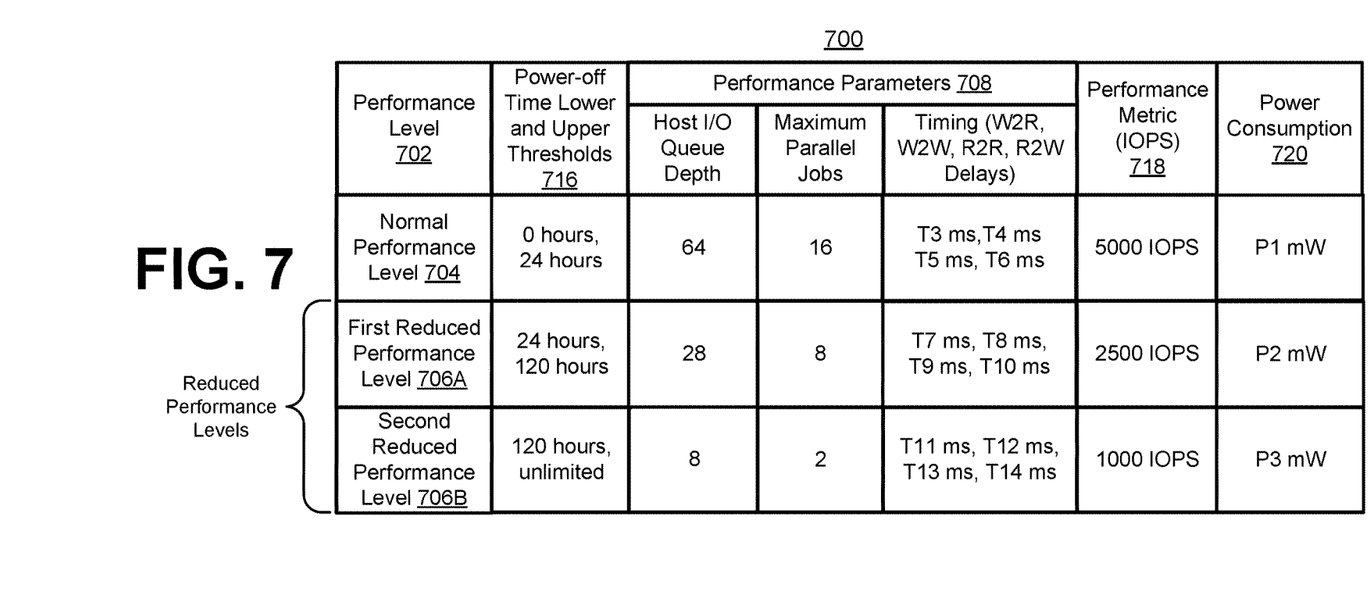
FIG. 7 illustrates a table including example performance levels and corresponding elapsed power-off time thresholds and performance parameters in accordance with some embodiments.

At operation 532, the processing device performs the write operation on the memory unit in accordance with the identified performance parameter values. At operation 534, responsive to completion of the write operation, the processing device sets the one or more performance parameters associated with the memory unit to respective values that correspond to a normal performance level. For example, table 700 specifies the performance parameters 708 that correspond to the normal performance level 704. In accordance with the normal performance level 704 of table 700, at operation 534 the processing device can set the host I/O queue depth associated with the memory unit 430 to 64, the maximum parallel jobs associated with the memory unit 430 to 16, and the timing delays associated with the memory unit 430 to T3 ms, T4 ms, T5 ms, and T6 ms (for the W2R, W2 W, R2R, and R2 W delay, respectively).

Figure 6:
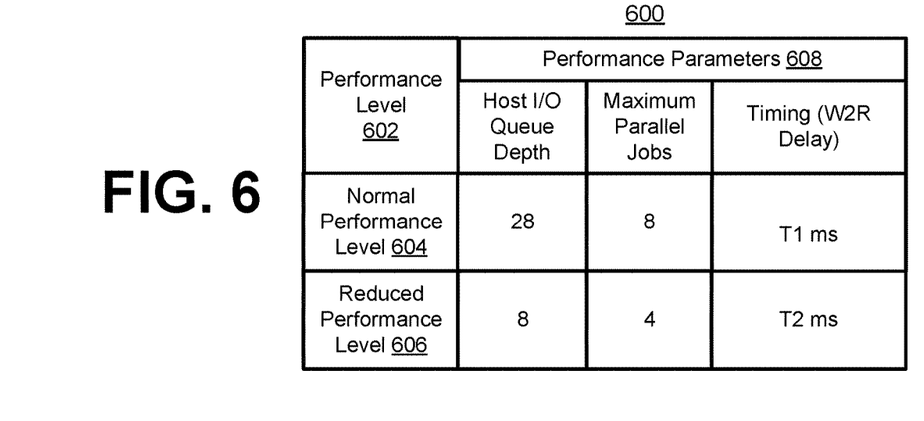
FIG. 6 illustrates a table including example performance levels and corresponding performance parameters in accordance with some embodiments.

FIG. 6 illustrates a table 600 including example performance levels 602 and corresponding performance parameters 608 in accordance with some embodiments. The table 600 maps each performance level 602 to corresponding values of performance parameters 608. The performance parameters 608 include a host I/O queue depth 610, a maximum number of parallel jobs 612, and a timing delay 614. The performance throttling component 113 can reduce performance of the memory sub-system 110 by setting the performance parameters 410 of a memory unit 430 to the values of the parameters 608 that correspond to the reduced performance level 606. Further, the performance throttling component 113 can increase performance of the memory sub-system 110 to a normal level by setting the performance parameters 410 of the memory unit 430 to the values of the parameters 608 that correspond to the normal performance level 604.

The table 600 specifies example values of performance parameters 608 for a normal performance level 604 and a reduced performance level 606. For the normal performance level 604, the example performance parameters include a host I/O queue depth value of 28, a maximum parallel jobs value of 8, and a timing (W2R delay) value of T1 milliseconds. For the reduced performance level 606, the example performance parameters include a host I/O queue depth value of 8, a maximum parallel jobs value of 4, and a timing (W2R delay) value of T2 milliseconds.

FIG. 7 illustrates a table 700 including example performance levels 702 and corresponding elapsed power-off time thresholds 716 and performance parameters 708 in accordance with some embodiments. The table 700 also specifies performance metrics 708 that represent an expected number of I/O operations per second and power consumption 720 that represents an expected power consumption of each performance level 702. The performance levels include a normal performance level 704, a first reduced performance level 706A, and a second reduced performance level 706B. The performance throttling component 113 can select the performance parameters 708 based on the elapsed power-off time. Longer elapsed power-off times correspond to lower performance levels that have lower performance metric values 718 and lower power consumption 720. Thus, each of the reduced performance levels 706 corresponds to a different range of elapsed power-off time, and lower performance levels 706 correspond to higher ranges of elapsed power-off time.

The normal performance level 704 has example performance parameters 708 that include a host I/O queue depth of 64, a maximum parallel jobs of 16, and timing (W2R, W2 W, R2R, and R2 W delays) of T3 ms, T4 ms, T5 ms, and T6 ms, respectively. The normal performance level 704 is also characterized by a performance metric 718 of 5000 input/output operations per second (IOPS) and a power consumption 720 of P1 milliwatts (mW).

The first reduced performance level 706A corresponds to a reduction in performance from the normal performance level 704, and the second reduced performance level 706B corresponds to a reduction in performance from the first reduced performance level 706A. The first reduced level 706A has a first threshold criterion that is satisfied when the elapsed power-off time is in a first range specified by lower and upper thresholds 716 of 24 hours and 120 hours, respectively. The second reduced level 706A has a second threshold criterion that is satisfied when the elapsed power-off time is in a second range specified by lower and upper thresholds 716 of 120 hours and an unlimited number of hours, respectively.

The performance throttling component 113 can reduce memory sub-system performance to the first reduced level 706A when the elapsed power-off time is in the first range. For longer elapsed power-off times, the performance throttling component 113 can reduce performance to the second reduced level 706B when the elapsed power-off time is in the second range.

The performance throttling component 113 can reduce performance of the memory sub-system 110 to the first reduced performance level 706A by setting the performance parameters 410 of a memory unit 430 to the parameter values 708 that correspond to the first reduced performance level 706A. The example performance parameter values 708 for the first reduced performance level 706A are a host I/O queue depth of 28, a maximum parallel jobs of 8, and timing (W2R, W2 W, R2R, and R2 W delays) of T7 ms, T8 ms, T9 ms, and T10 ms, respectively. The first reduced performance level 706A is also characterized by a performance metric 718 of 2500 IOPS and a power consumption 720 of P2 milliwatts (mW).

The performance throttling component 113 can reduce performance of the memory sub-system 110 to the second reduced performance level 706B by setting the performance parameters 410 of a memory unit 430 to the parameter values 708 that correspond to the second reduced performance level 706B. The example performance parameter values 708 for second reduced performance level 706B are a host I/O queue depth of 8, a maximum parallel jobs of 2, and timing (W2R, W2 W, R2R, and R2 W delays) of T11 ms, T12 ms, T13 ms, and T14 ms, respectively. The second reduced performance level 706B is also characterized by a performance metric 718 of 1000 input/output operations per second (IOPS) and a power consumption 720 of P3 milliwatts (mW).

Figure 8:
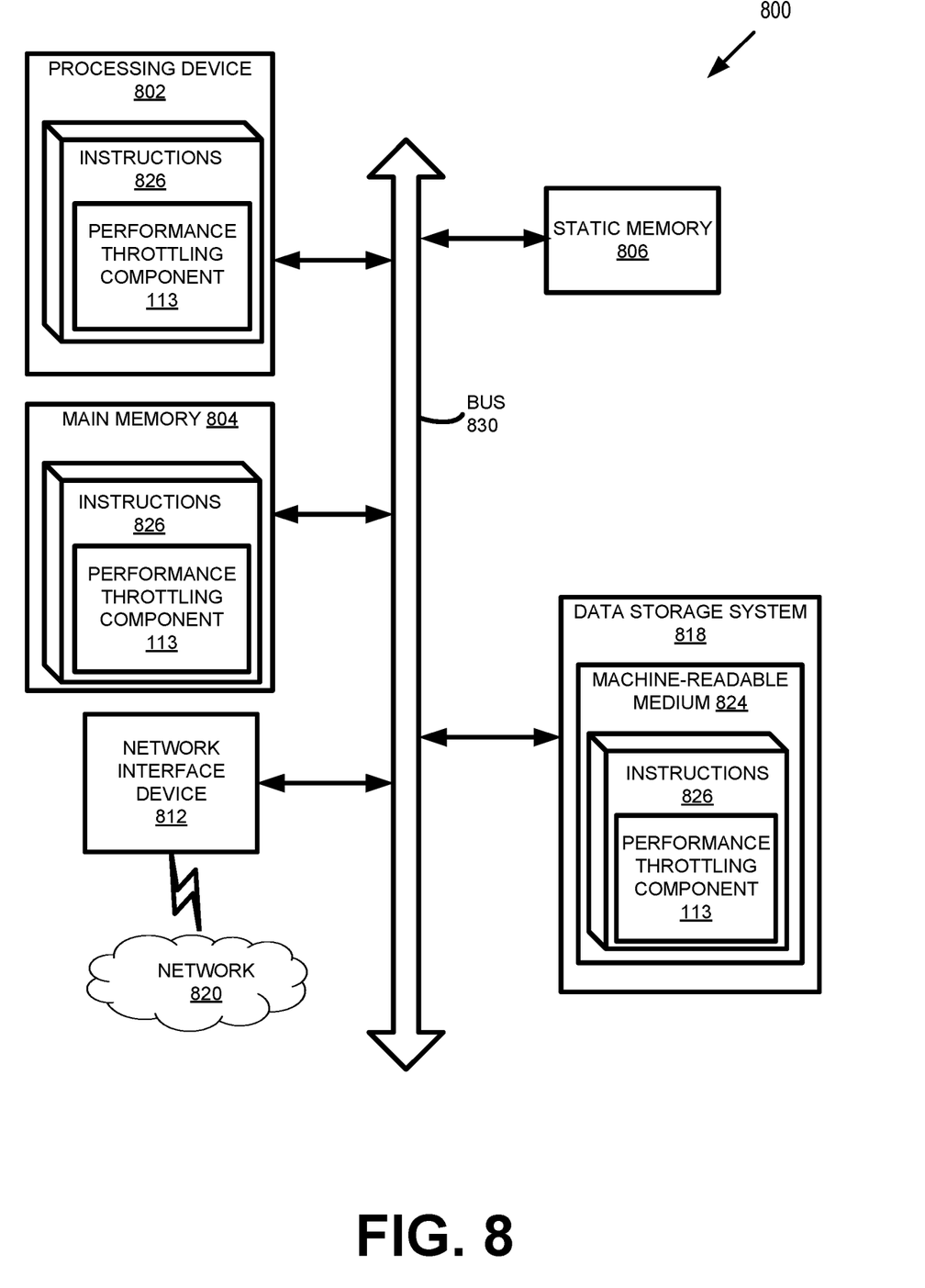
FIG. 8 is a block diagram of an example computer system in which implementations of the present disclosure can operate.

FIG. 8 illustrates an example machine of a computer system 800 within which a set of instructions, for causing the machine to perform any one or more of the methodologies discussed herein, can be executed. In some embodiments, the computer system 800 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to a performance throttling component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, digital or non-digital circuitry, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage system 818, which communicate with each other via a bus 830.

Processing device 802 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 can also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein. The computer system 800 can further include a network interface device 808 to communicate over the network 820.

The data storage system 818 can include a machine-readable storage medium 824 (also known as a computer-readable medium) on which is stored one or more sets of instructions 826 or software embodying any one or more of the methodologies or functions described herein. The instructions 826 can also reside, completely or at least partially, within the main memory 804 and/or within the processing device 802 during execution thereof by the computer system 800, the main memory 804 and the processing device 802 also constituting machine-readable storage media. The machine-readable storage medium 824, data storage system 818, and/or main memory 804 can correspond to the memory sub-system 110 of FIG. 1.

In one embodiment, the instructions 826 include instructions to implement functionality corresponding to a read voltage adjustment component (e.g., the performance throttling component 113 of FIG. 1). While the machine-readable storage medium 824 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a memory device; and
    a processing device, operatively coupled to the memory device, to perform operations comprising:
        receiving a request to perform a write operation on a memory unit of the memory device;
        determining whether the memory unit has previously been written to at least once since power on of the memory device;
        responsive to determining that the memory unit has not previously been written to at least once since power on of the memory device:
            determining an elapsed power-off time based on a difference between a time at which a power-on occurred and a time at which a previous power-off of the memory device occurred;
            determining whether the elapsed power-off time satisfies an elapsed time threshold criterion;
            responsive to determining that the elapsed power-off time satisfies the elapsed time threshold criterion:
                changing a performance parameter associated with the memory unit of the memory device to a first parameter value that corresponds to a reduced performance level; and
                performing the write operation on the memory unit of the memory device in accordance with the first parameter value that corresponds to the reduced performance level.

2. The system of claim 1, wherein the write operation is the first write operation performed on the memory unit following the power-on of the memory device.

3. The system of claim 1, the operations further comprising:
    responsive to completion of the write operation, changing the performance parameter associated with the memory unit to a second parameter value that corresponds to a normal performance level.

4. The system of claim 3, wherein the reduced performance level is associated with reduced power consumption level that is lower than a normal power consumption level associated with the normal performance level.

5. The system of claim 3, wherein the performance parameter comprises one or more of a number of memory operations that can be performed in parallel, a memory operation queue depth, or a timing delay between consecutive memory operations.

6. The system of claim 5, wherein the timing delay comprises one or more of a write to read (W2R) delay, a write to write (W2W) delay, a read to write (R2W delay), or a read to read (R2R) delay) between the consecutive memory operations.

7. The system of claim 1, the operations further comprising:
determining the first parameter value that corresponds to the reduced performance level in accordance with the elapsed power-off time.

8. The system of claim 7, wherein the first parameter value that corresponds to the reduced performance level is determined using a mapping table that maps elapsed power-off times to performance parameter values, wherein the mapping table maps each elapsed power-off time to a corresponding performance parameter value.

9. The system of claim 8, wherein the mapping table comprises a plurality of records, each record comprising an elapsed power-off time threshold criterion and one or more corresponding performance parameter values, wherein determining the first parameter value that corresponds to the reduced performance level comprises:
identifying, in the mapping table, a record comprising an elapsed power-off time threshold criterion that corresponds to the elapsed power-off time, wherein the identified record further comprises the first parameter value that corresponds to the reduced performance level.

10. A method comprising:
receiving, by a processing device, a request to perform a write operation on a memory unit of a memory device;
determining whether the memory unit has previously been written to at least once since power on of the memory device;
responsive to determining that the memory unit has not previously been written to at least once since power on of the memory device:
determining an elapsed power-off time of the memory device based on a time difference between the power on of the memory device and a power off of the memory device that preceded the power on;
identifying one or more performance parameter values that correspond to the elapsed power-off time;
setting one or more performance parameters associated with the memory unit of the memory device to the respective identified performance parameter values; and
performing the write operation on the memory unit of the memory device in accordance with the identified performance parameter values.

11. The method of claim 10, further comprising:
responsive to completion of the write operation, setting the one or more performance parameters of the memory unit to respective values that correspond to a normal performance level.

12. The method of claim 10, wherein the one or more performance parameters comprise one or more of a number of memory operations that can be performed in parallel, a memory operation queue depth, or a timing delay between consecutive memory operations.

13. The method of claim 12, wherein the timing delay comprises one or more of a write to read (W2R) delay, a write to write (W2W) delay, a read to write (R2W delay), or a read to read (R2R) delay) between the consecutive memory operations.

14. A non-transitory computer readable medium comprising instructions, which when executed by a processing device, cause the processing device to perform operations comprising:
receiving a request to perform a write operation on a memory unit of a memory device;
determining whether the memory unit has previously been written to at least once since power on of the memory device;
responsive to determining that the memory unit has not previously been written to at least once since power on of the memory device;
determining an elapsed power-off time based on a difference between a time at which a power-on occurred and a time at which a previous power-off of the memory device occurred;
determining whether the elapsed power-off time satisfies an elapsed time threshold criterion;
responsive to determining that the elapsed power-off time satisfies the elapsed time threshold criterion:
changing a performance parameter associated with the memory unit of the memory device to a first parameter value that corresponds to a reduced performance level; and
performing the write operation on the memory unit of the memory device in accordance with the first parameter value that corresponds to the reduced performance level.

15. The non-transitory computer readable medium of claim 14, wherein the write operation is the first write operation performed on the memory unit following the power-on of the memory device.

16. The non-transitory computer readable medium of claim 14, the operations further comprising:
responsive to completion of the write operation, changing the performance parameter associated with the memory unit to a second parameter value that corresponds to a normal performance level.

17. The non-transitory computer readable medium of claim 16, wherein the performance parameter comprises one or more of a number of memory operations that can be performed in parallel, a memory operation queue depth, or a timing delay between consecutive memory operations.

18. The non-transitory computer readable medium of claim 17, wherein the timing delay comprises one or more of a write to read (W2R) delay, a write to write (W2W) delay, a read to write (R2W delay), or a read to read (R2R) delay) between the consecutive memory operations.

19. The non-transitory computer readable medium of claim 14, the operations further comprising:
determining the first parameter value that corresponds to the reduced performance level in accordance with the elapsed power-off time.

20. The non-transitory computer readable medium of claim 19, wherein the first parameter value that corresponds to the reduced performance level is determined using a mapping table that maps elapsed power-off times to performance parameter values, wherein the mapping table maps each elapsed power-off time to a corresponding performance parameter value.

* * * * *